United States Patent [19]

Hendershot et al.

[11] Patent Number: 4,796,676

[45] Date of Patent: Jan. 10, 1989

[54] FLUID STORAGE TANK SYSTEM

[76] Inventors: John A. Hendershot, P.O. Drawer 789, Shawnee, Okla. 74801; Leale E. Streebin, 2301 Morgan Dr., Norman, Okla. 73069

[21] Appl. No.: 58,798

[22] Filed: Jun. 5, 1987

[51] Int. Cl.$^4$ .................. G08B 21/00; G01M 3/26
[52] U.S. Cl. ........................... 141/83; 141/65; 141/98; 141/1; 73/49.2; 73/49.3; 340/605; 220/85 B
[58] Field of Search ............ 220/85 B, 403, 404; 206/524.3, 524.5; 340/605; 73/49.2, 49.3, 40, 299; 52/19, 20; 404/25, 26; 141/65.1, 83.4, 94.5, 95.7, 114.8, 98; 138/104, 148, 149; 137/363, 364, 371, 375, 376, 557, 558

[56] References Cited

U.S. PATENT DOCUMENTS

| | | | |
|---|---|---|---|
| 2,346,423 | 4/1944 | Gray | 73/40 |
| 2,762,736 | 9/1956 | Beuglet | 156/286 |
| 2,847,959 | 8/1958 | Switzer | 220/410 |
| 3,028,750 | 4/1962 | Rondeau | 73/49.2 |
| 3,064,344 | 11/1962 | Arne | 29/421 |
| 3,848,765 | 11/1974 | Durkop | 73/49.2 X |
| 3,942,331 | 3/1976 | Newman, Jr. et al. | 62/45 |
| 4,172,477 | 10/1979 | Reich | 141/8 |
| 4,230,061 | 10/1980 | Roberts et al. | 220/85 B X |
| 4,408,628 | 10/1983 | Monk | 220/85 B X |
| 4,437,987 | 3/1984 | Thorton et al. | 220/85 B X |
| 4,523,454 | 6/1985 | Sharp | 73/49.2 |
| 4,524,609 | 6/1985 | Sharp | 73/49.2 |
| 4,537,328 | 8/1985 | Keesee et al. | 73/49.2 X |
| 4,568,925 | 2/1986 | Butts | 340/605 |
| 4,598,742 | 7/1986 | Taylor | 141/95 |
| 4,602,250 | 7/1986 | Peace | 340/605 |
| 4,607,522 | 8/1986 | Sharp | 73/49.2 |
| 4,648,523 | 3/1987 | Strock | 220/85 B X |
| 4,651,893 | 3/1987 | Mooney | 73/49.2 X |
| 4,670,847 | 6/1987 | Furuse | 73/49.2 |
| 4,672,366 | 6/1987 | Butts | 340/605 |
| 4,685,327 | 8/1987 | Sharp | 73/49.2 |
| 4,688,587 | 8/1987 | Bourgeon | 141/95 X |
| 4,696,186 | 9/1987 | Sharp | 73/49.2 |
| 4,708,015 | 11/1987 | Sharp | 73/49.2 |

FOREIGN PATENT DOCUMENTS

| | | | |
|---|---|---|---|
| 2161564 | 6/1973 | Fed. Rep. of Germany | 73/49.3 |
| 2225456 | 12/1973 | Fed. Rep. of Germany | 73/49.2 |
| 2329525 | 1/1975 | Fed. Rep. of Germany | 73/49.3 |
| 1966825 | 1/1975 | Fed. Rep. of Germany | 73/49.2 |
| 2352544 | 4/1975 | Fed. Rep. of Germany | 73/49.3 |
| 2735804 | 2/1979 | Fed. Rep. of Germany | 73/49.2 |
| 0108012 | 8/1979 | Japan | 73/49.2 |
| 428341 | 7/1967 | Switzerland | 73/49.2 |

OTHER PUBLICATIONS

The Steel Tank Institute Standard for Dual Wall Underground Steel Storage Tanks.
Federal Register, Friday, Apr. 17, 1987, vol. 52, No. 74.
Petroleum Marketer, Jul.-Aug. 1987, "Tank Industry Eyes Market Demand Over the Next Ten Years".
Petroleum Marketer, Jul.-Aug., 1987, p. 34, MPC Containment Systems, Ltd., of Chicago, Ill. (advertisement).
Fuel Oil News, pp. 62–65, "Underground Storage Tanks: Management's Latest Challenge", by Albert D. Young, Jr. (Sep. 1987).

Primary Examiner—Henry J. Recla
Assistant Examiner—Ernest G. Cusick
Attorney, Agent, or Firm—Laney, Dougherty, Hessin & Beavers

[57] ABSTRACT

A storage tank system for storing fluids in an environmentally safe container which includes a rigid external primary tank having a flexible protective secondary inner tank positioned within the tank and drawn, by negative pressure, into contact with the internal walls of the rigid external tank. A continuous monitoring system is connected into, and made a part of, the portion of the system used to evacuate the space between the inner and outer tanks, so that any leakage or loss of integrity which is developed in the liner can be immediately detected at any time.

21 Claims, 7 Drawing Sheets

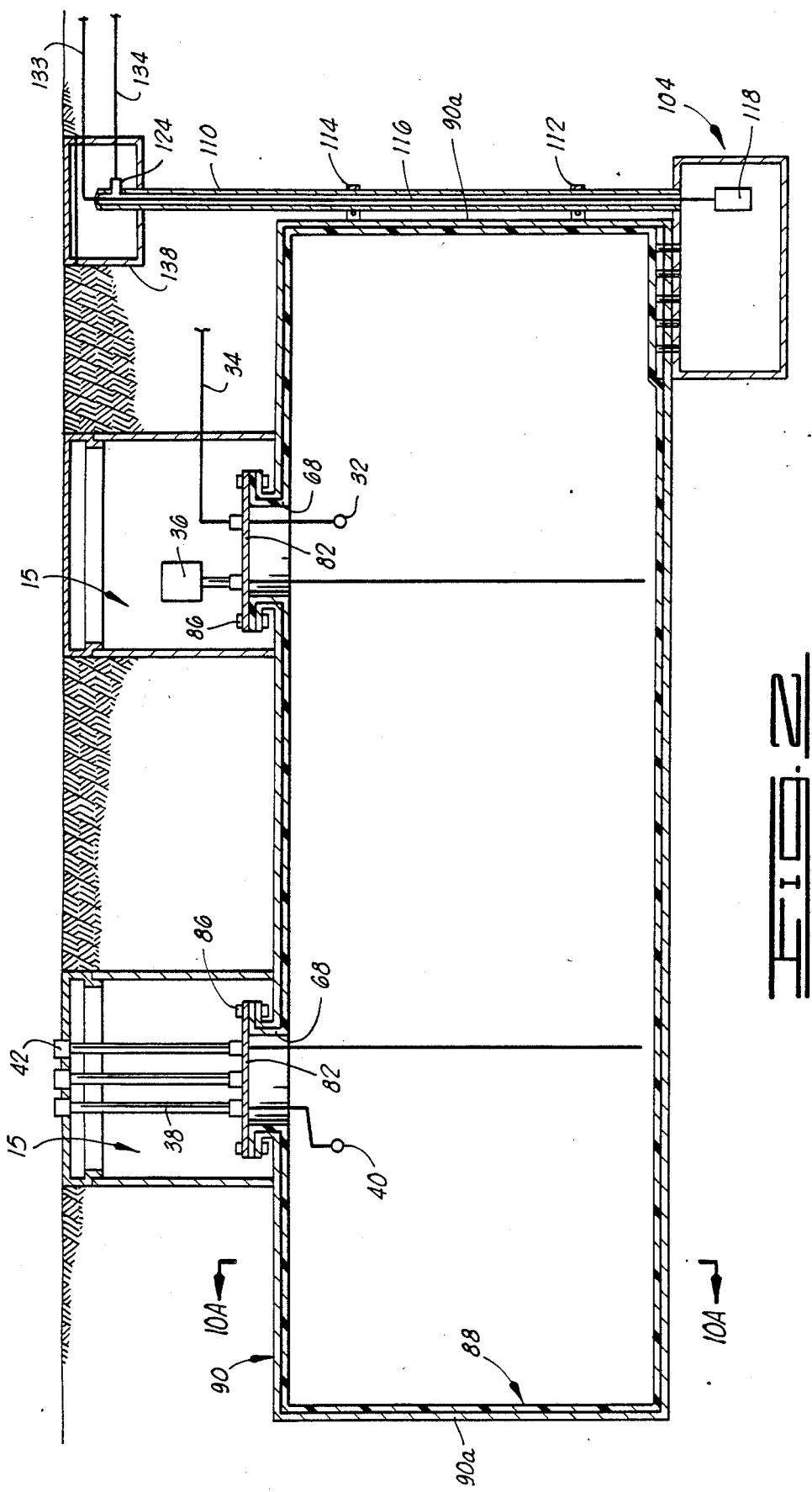

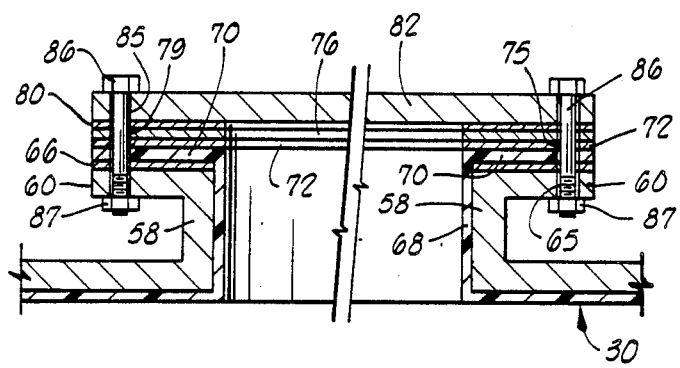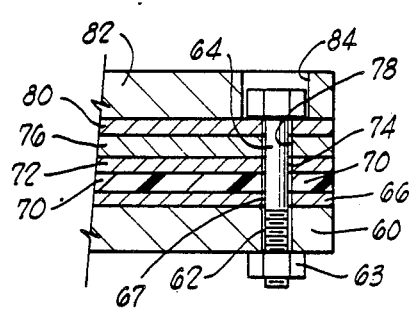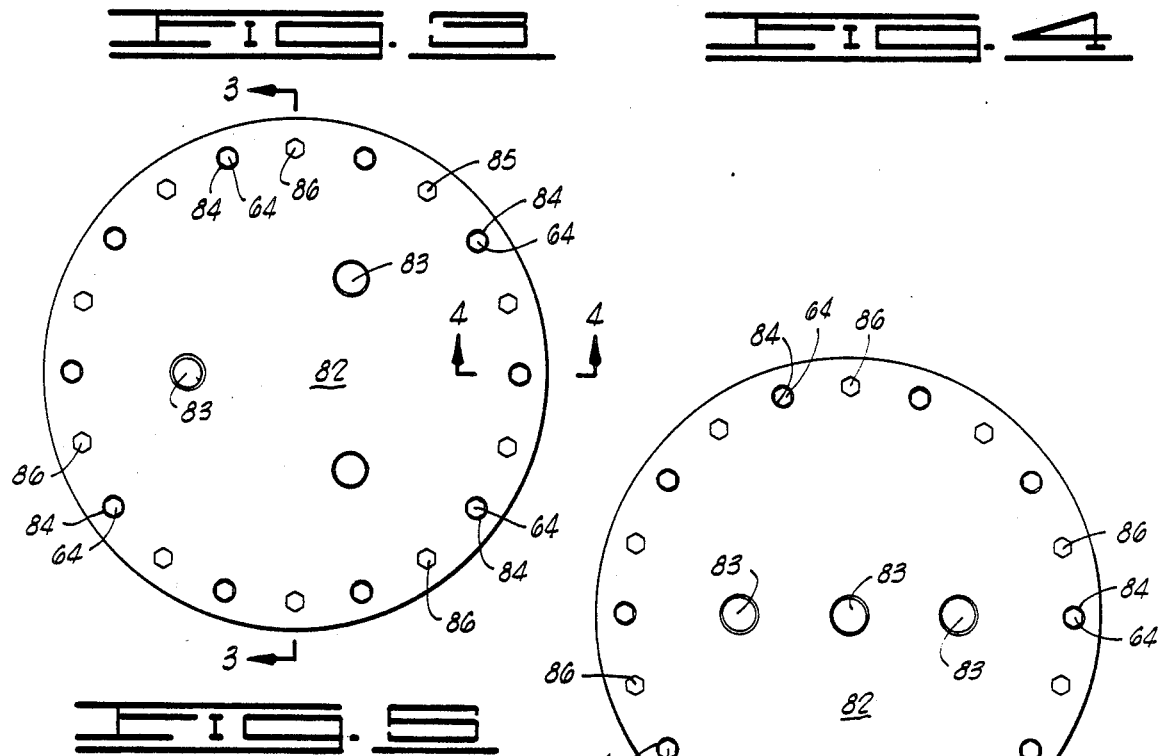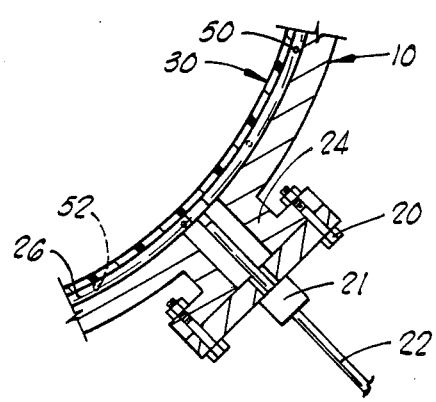

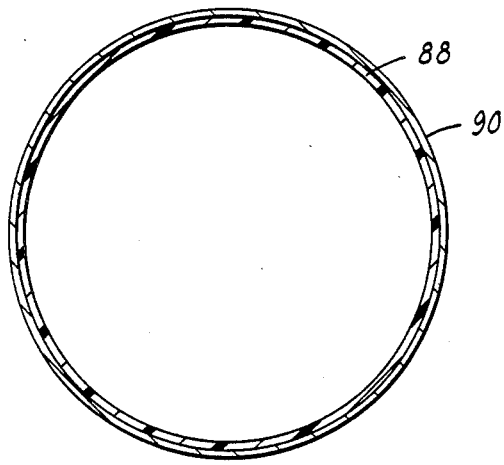
FIG.10A
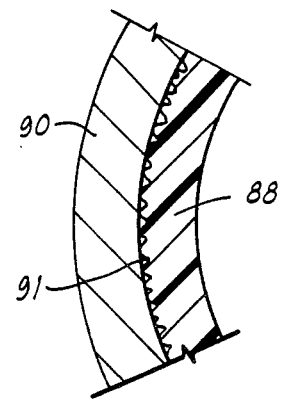
FIG.10B
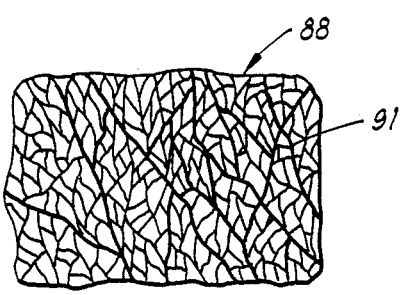
FIG.10C
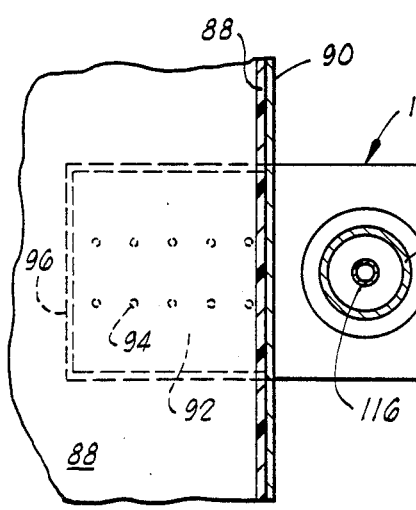
FIG.12
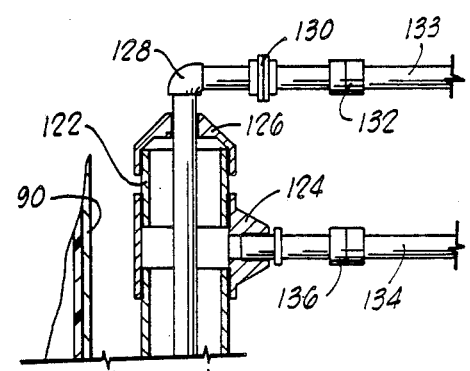
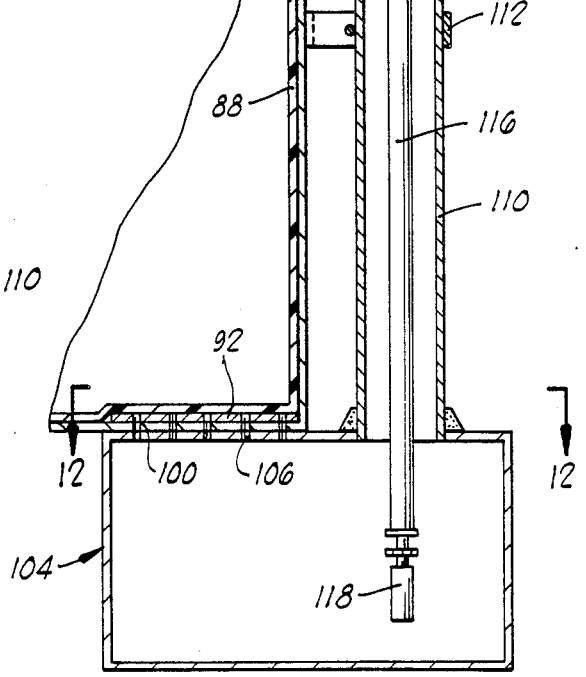
FIG.11

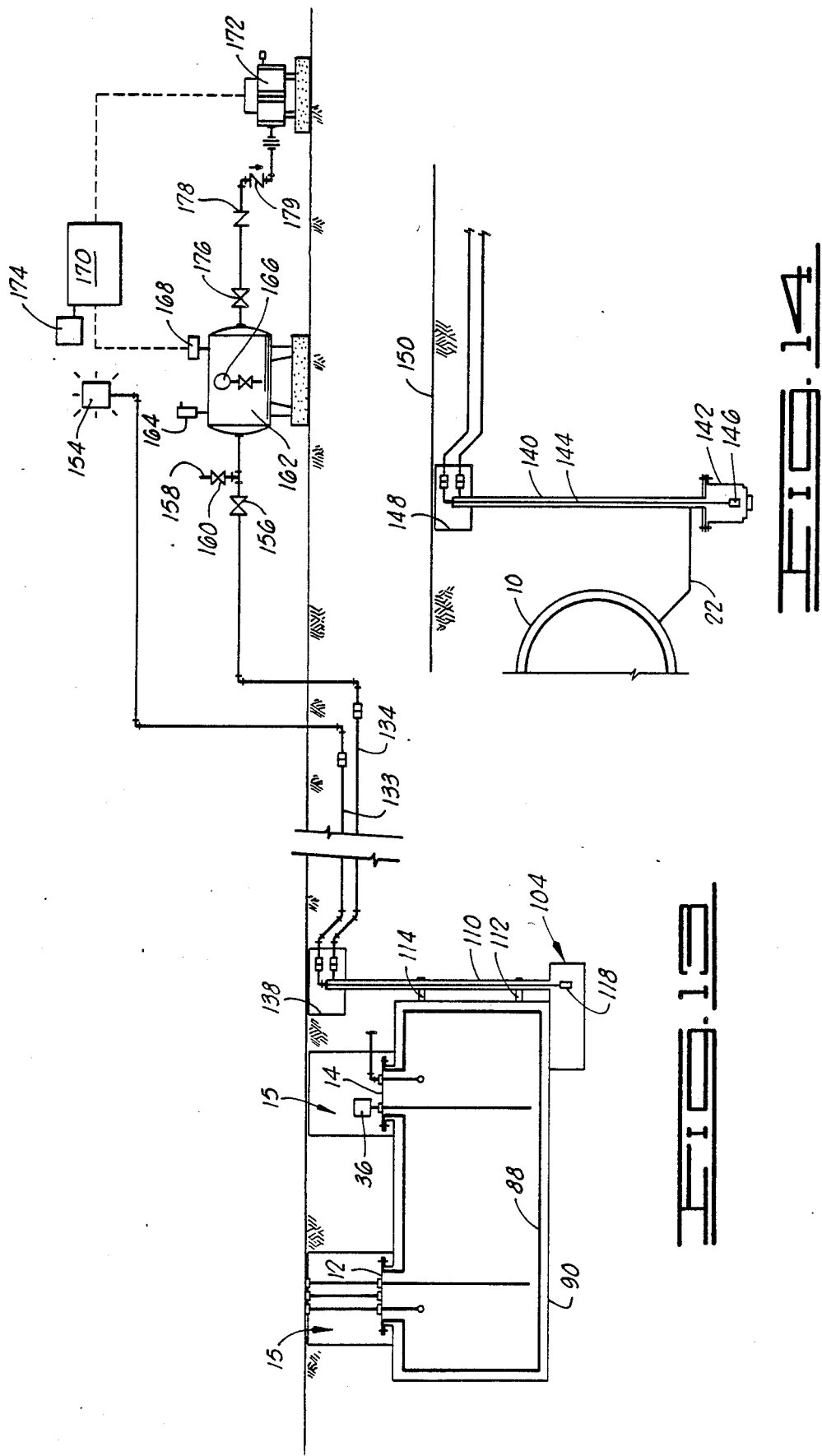

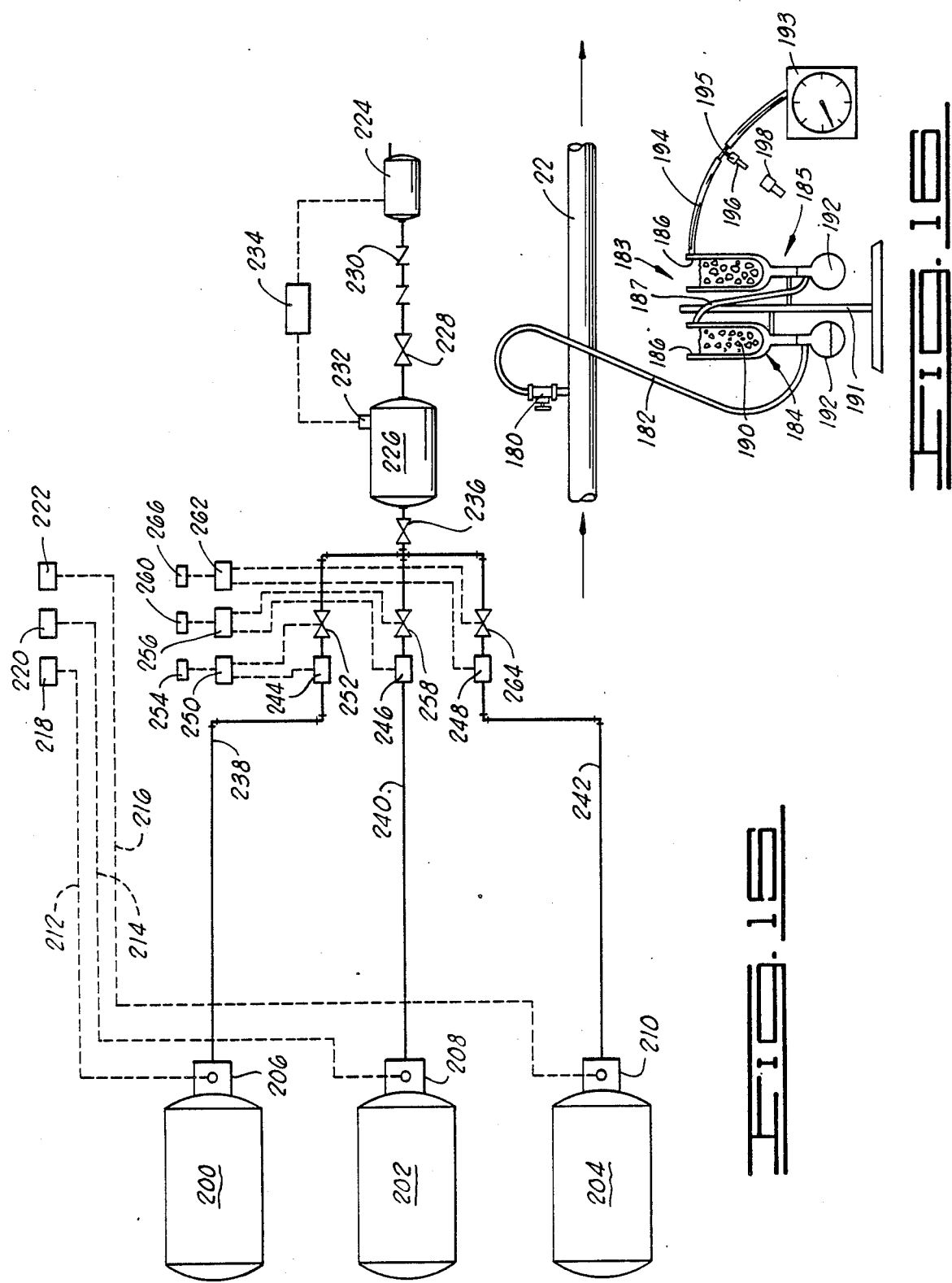

FLUID STORAGE TANK SYSTEM

FIELD OF THE INVENTION

This invention relates to large, multiple walled tank systems, and more particularly, but without limitation thereto, to tanks for safely storing toxic, or corrosive, or environmentally hazardous fluids or petroleum products and hydrocarbon fuels.

BACKGROUND OF THE INVENTION

Brief Description of Prior Art

Many technically informed personnel today regard leaks from underground chemical storage tanks as the most prevalent source of drinking water contamination. In a recent study by the Environmental Protection Agency of the United States, it was estimated that there are approximately 800,000 individual motor-fuel storage tanks, including tanks for storage of gasoline and diesel oil, located in about 325,000 establishment locations in the United States. The study moreover indicated that at least twenty five percent of these tank systems had significant leakage when the pressure in them was slightly elevated. The average rate of leaking from these tanks was about 0.31 gallons per hour, with half of the leaks being about 0.25 gallons per hour or less. Fiberglass tanks appeared to have failure rates approximately as high as the failure rates for steel tanks. About twenty one percent of the motor-fuel storage tanks are installed, partly or completely below the water table in the ground.

In the case of steel tanks, it is a widespread practice to protect such tanks against corrosion by electrically isolating connecting piping of dissimilar metals to prevent the development of corrosive currents, by protectively coating the inside and outside of the steel tank with a dielectric coating material, by means of cathodic protection which utilizes a sacrificial anode in order to reverse corrosive underground current flow and by placing an impressed current on the tank. Such corrosion protection systems do limit, but do not entirely eliminate the deleterious effects of corrosion.

The Steel Tank Institute in the United States has developed certain standards for double containment, atmospheric-type rigid steel vessels for containing petroleum-derived products, such as gasoline and diesel oil, or for containing hazardous chemicals. The dual or double-walled tanks generally include an outer steel wrap which extends over the predominant portion of the lower circumference of the internal tank. The outer wrap or tank is welded to the inner tank only at the upper perimeter of the outer wrap or tank where it is joined to the inner tank to make the secondary containment which it affords liquid tight. A system for monitoring the interstitial space between the outer wall and the inner wall has been proposed which includes use of vacuum developed in this interstitial space. Before installation, the inner tank is tested at a positive pressure and excessive atmospheric pressure to determine the presence of leaks. At the same time that the positive pressure is applied internally in the inner tank, equivalent positive pressure is developed in the interstitial space between the outer wrap and the inner tank. All visible seams and welds are then covered with a soap solution for the purpose of detecting leaks.

Fiberglass tanks do not suffer from the effects of galvanic corrosion, and are inert to some corrosive stored liquids. A problem which has been encountered with fiberglass underground storage tanks, however, is that unless they are loaded perfectly for transport, the vibration and jolting encountered can cause these tanks to develop cracks before they even arrive at the installation site. Such tanks have been known to shatter when lifted improperly, or when dropped during installation. The site itself must be prepared to exacting specifications to prevent uneven stresses from developing which will later cause a fracture in the tank following installation.

It is known to place flexible or semi-rigid liners within metallic liquid storage tanks in order to protect the tank from corrosive fluids to be stored therein. Thus, Beuglet, U.S. Pat. No. 2,762,736 proposes to line a metallic tank with a plastic liner, adhering the liner to the tank's internal wall by means of evacuation through a fitting providing communication with the interior of the tank.

The liner of Beuglet protects the tank from corrosion. Moreover, fluids can be contained in metal tanks without undergoing metal contamination. A wire netting or grid can be interposed between flat plastic plates formed on one side of the liner and the tank wall so as to permit the vacuum to act over the entire exposed surface of the liner and draw it uniformally into contact with the wire netting when the air is evacuated from the intervening space. The tank is provided with a manhole cover for covering the main opening into the tank, and the means used to secure the manhole cover in position is also utilized, in part, to secure the internal liner within the tank.

The system depicted and described in the Bueglet patent makes no provision for continuously monitoring the integrity of the system to determine whether the liner has developed a leak, or remains satisfactorily in tact, and for intermittently evacuating the space between the liner and tank. Such a monitoring system is provided in the present invention, and the system by which the space between the liner and the tank is evacuated has also been improved relative to that depicted in the Beuglet patent.

Switzer, U.S. Pat. No. 2,847,959 is also concerned with the placement of a flexible liner within a metallic container. The space between the liner and the container is evacuated so that the liner is expanded and held in intimate contact with, the wall of the container. In the Switzer patent, the hole or space through which the air is drawn out and the space evacuated is subsequently sealed after the liner has been drawn into contact with the internal wall of the container. Once this opening has been sealed, there is no further opportunity to restore the vacuum between the liner and internal wall of the container, or to monitor the integrity of the liner, except by visual inspection of the interior of the container at periodic intervals.

Gray, U.S. Pat. No. 2,346,423 is concerned with lining a steel tank with a malleable metal, such as copper. In order to force the copper liner into intimate contact with the entire internal surface of a surrounding steel tank, the liner is filled with water to a test pressure of about 300 p.s.i., and the air in the space between the vessel or jacket and the liner is concurrently evacuated. Although there is provision for measuring the extent to which the space between the copper liner and the steel tank has been evacuated, once the evacuation operation is completed, the fitting to which this gauge is connected, and in fact, to which the vacuum pump has been connected, is sealed off permanently, and there then follows no further vacuum testing by means of a gauge connected at this point.

Arne, U.S. Pat. No. 3,064,344 proposes to place a flexible metallic liner inside a steel vessel. A vacuum is drawn between the liner and the tank shell to pull the liner out against the shell and keep the liner from buckling. The metallic liner will present the disadvantage of being reactive with some types of chemicals stored in the tank.

U.S. Pat. No. 3,942,331 to Mewman, Jr. et al. discloses a cryogenic tank for holding cryogenic liquids. A relatively thin sealing membrane is provided inside a housing or other rigid vessel, and the space between the sealing membrane and the rigid outer wall of the vessel is filled with an insulating material. The insulating material is said to define a plurality of ducts or conduits between the insulating material and the outer wall of the vessel. These ducts or conduits can receive gases indicative of leakage from the tank and transmit these gases through an external conduit system to a gas detector device.

The Mewman system does not appear to propose or offer any sort of arrangement for continuously monitoring the vacuum which exists between the relatively thin sealing membrane and the housing or outer vessel.

BRIEF DESCRIPTION OF THE PRESENT INVENTION

The present invention provides a fluid storage system which retains high sealing integrity in the storage of volatile or corrosive fluids. By reason of the construction employed, the fluid storage system is characterized in having a relatively long and trouble free operating life during which the system functions to prevent contamination of the environment.

Broadly described, the system of the invention includes a substantially rigid, secondary outer tank. Removably positioned within the outer tank is a primary container which is a flexible, corrosion resistant liner or flexible inner tank (FIT). The liner or flexible inner tank can be easily removed from the rigid outer container for replacement via a manway provided in the outer container. Alternatively, the flexible inner tank can be repaired while it remains in operative position inside the outer tank.

In one embodiment of the invention, a suction pipe network is interposed between the outer tank and the flexible inner tank. A source of vacuum is connected to the suction pipe network to remove the air from the space located between the inner tank and the outer tank. This causes the inner tank to move outwardly against the outer tank. The inner tank contains a fluid to be stored and protects the outer tank, which may, for example, be steel, fiberglass, or any rigid or semi-rigid material against contact with the liquid or gas in the tank. An important aspect of the invention is a monitoring system which is connected between the suction pipe network and a source of vacuum used to evacuate the suction pipe assembly. The purpose of having the monitoring system at this location is to continuously monitor the integrity of the flexible inner tank, as well as of the outer tank.

In another, preferred embodiment of the invention, a roughened or embossed surface flexible material is used in the construction of the inner tank, and the embossing replaces and delivers the function of, the suction pipe network.

Liquid collection and monitoring devices are provided for use with all embodiments for detecting liquid and vapor leakage.

An important object of the present invention is to provide an improved storage tank system which may include, as a part thereof, a relatively old, rigid metallic external tank which has, over a period of extended usage, developed unsatisfactory porosity for fluids to be stored therein, but which affords adequate structural strength to support and maintain the shape of a high integrity, flexible inner tank positioned within the external tank and drawn thereagainst by vacuum.

One of the most important advantages of the fluid storage tank system is the continuous monitoring which performs two functions on a continuous basis. First, the system monitors variations in pressure due to some leakage, either of an unexpected magnitude, or slow, natural leakage within acceptable tolerances. Second the system continuously monitors the leakage of liquid or condensible vapor into the space between the flexible inner tank and the rigid outer tank, followed by gravitation of this liquid into the sump chamber at one end of the tank. Leaking vapor or gas can be detected by condensing it in an acetone-carbon dioxide trap, or by other means.

A further advantage of the invention is to provide a method by which any subterranean fluid-containing tank surrounded by earth can be made fluid impermeable very quickly, and so as to have a leak-free life which can be greater than that which was characteristic of the original tank when first installed in the earth.

Another very important object of the invention is to provide a fluid storage tank system including a flexible internal tank and a rigid external tank, with the space between the two tanks evacuated so as to draw the internal tank against the external tank, which system includes means for continuously monitoring the space between the two tanks to evaluate the integrity of both, and to provide an indication of any leakage which may have developed into the space between the tanks.

Another object of the invention is to provide a lined tank system which allows for superior operation and extended service life without the development of leaks, but which can detect the occurrence of minor leaks at a time prior to significant enlargement of the leakage.

Another object of the invention is to prevent the escape of any fluids which may pass through a leak in an inner tank, and to thereby prevent contamination of the environment.

An additional object of the invention is to provide a fluid storage tank system which includes a flexible inner tank, and a rigid outer tank and which includes means by which the leakage of any liquid into the space between the two tanks can be detected, and the rate of liquid leakage evaluated.

Yet another object of the invention is to provide a fluid storage tank suitable for the underground storage of liquids, and which includes a portion which can be extricated from the earth quite easily and quickly repaired and re-positioned in the earth so as to terminate or alleviate any liquid leakage from the tank which may be occurring, and which repairs can be effected without the necessity to excavate or remove any earth from around the storage tank system.

Another object of the invention is to provide a fluid storage tank system which is relatively inert to almost all types of stored liquids and does not contaminate them.

Another object of the invention is to internally protect a rigid metallic storage against corrosion by lining the tank with an inert flexible liner which does not undergo attack by the stored liquid, and which is relatively inert chemically to the contents of the tank and functions to protect against corrosion the steel, external tank within which the liner is located.

Additional objects and advantages of the invention will become apparent as the following detailed description of certain preferred embodiments of the invention is read in conjunction with a perusal of the accompanying drawings which illustrate such embodiments.

GENERAL DESCRIPTION OF THE DRAWINGS

FIG. 1 is a horizontal, sectional view along the longitudinal center line of a subterranean storage tank system constructed in accordance with the present invention, and constituting one operative embodiment of the invention.

FIG. 2 is a horizontal, sectional view similar to FIG. 1, but taken along the longitudinal center line of a square-ended, generally cylindrical subterranean storage tank system constructed in accordance with the present invention, and constituting a preferred embodiment of the invention. In this embodiment, a flexible embossed inner tank or liner is utilized in a rigid outer tank, and is drawn against the internal tank walls by applied vacuum.

FIG. 3 is a sectional view taken along line 3—3 of FIG. 5, and illustrating in detail along with FIG. 4, a manhole in a tank system constructed in accordance with the invention, and showing the manner in which the manhole is constructed, and how the flexible tank or liner is secured in position at the manhole, while permitting a manhole cover to be quickly and easily removed without disturbing the liner securement.

FIG. 4 is a sectional view taken along line 4—4 of FIG. 5.

FIGS. 5 and 6 are plan views which illustrate two tank system manhole cover arrangements which facilitate the closure of the tank systems constructed in accordance with the present invention, and having a liner or flexible internal tank securement subassembly of the sort shown in FIGS. 3 and 4.

Figure 1:
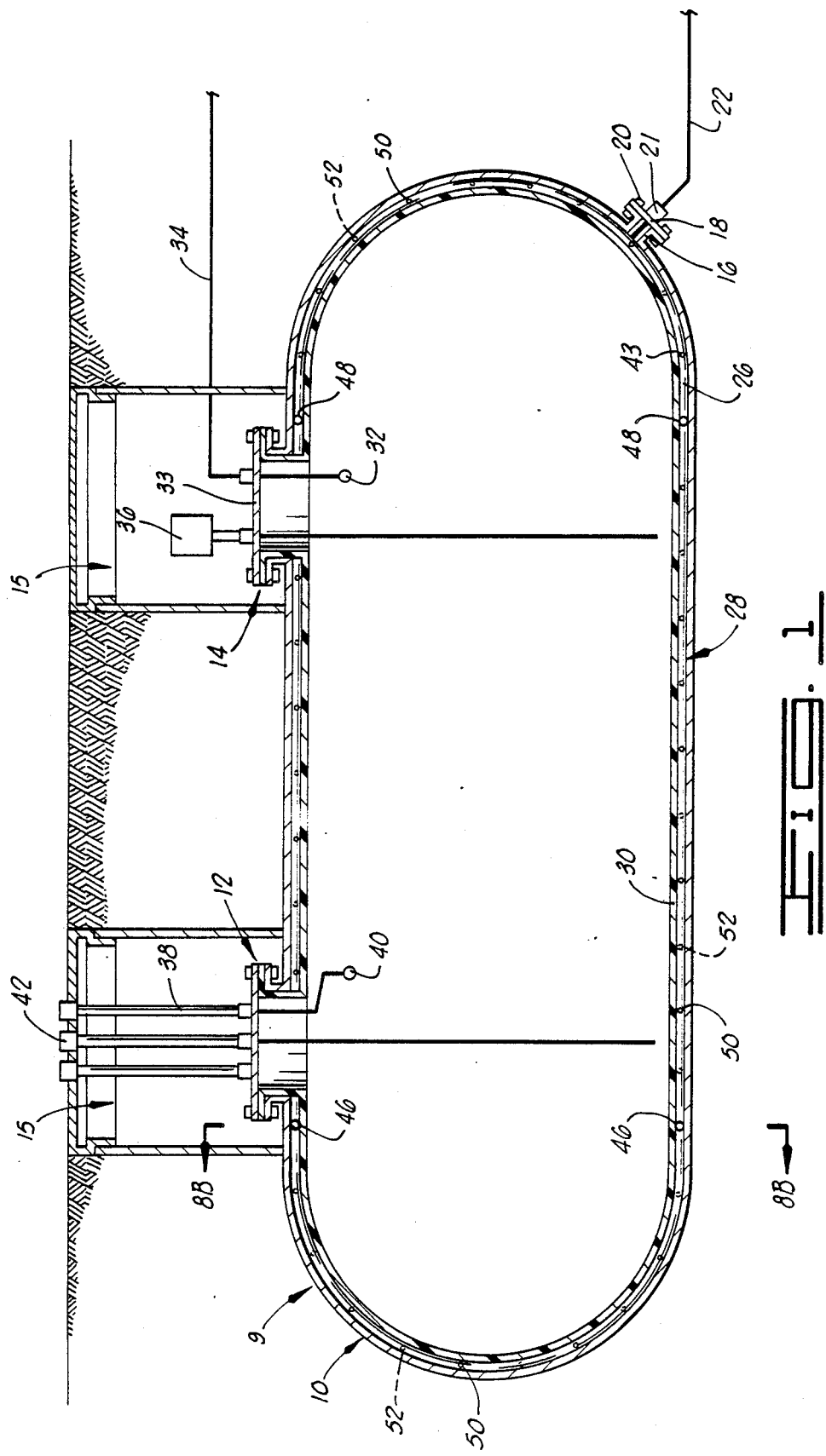

FIG. 7 is a sectional view of a structural detail which illustrates one type of fitting which can be provided on the rigid external tank to form a part of the system of the invention, through which fitting, a conduit extends and is connected at its inner end to an evacuation conduit or tubing network of the type typically utilized in the embodiment of the invention shown in FIG. 1 for the purpose of evacuating the space between the flexible inner tank or liner and the rigid external tank.

Figure 8A:
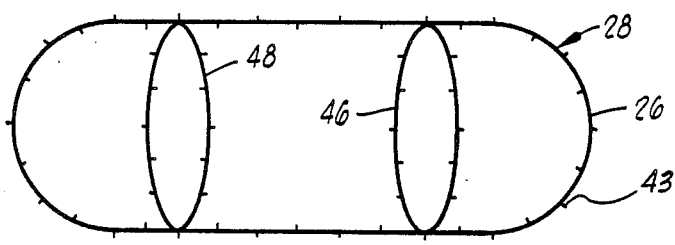

FIG. 8a is a schematic illustration depicting the evacuation tubing network utilized in the embodiment of the invention depicted in FIG. 1 for evacuating the space between a flexible inner tank and a rigid external tank.

Figure 8B:
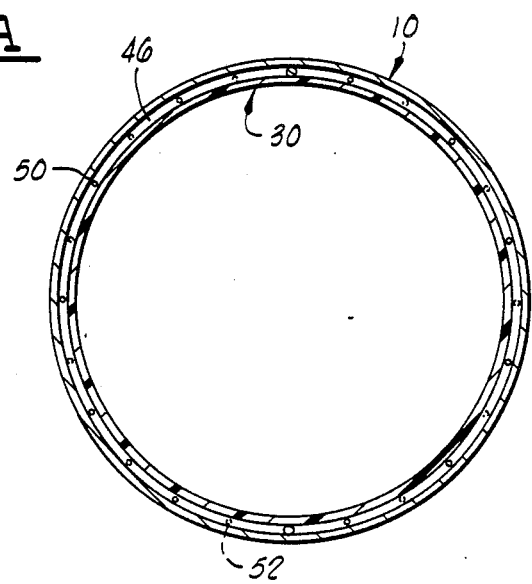

FIG. 8b is a sectional view taken along line 8b—8b of FIG. 1.

Figure 9A:
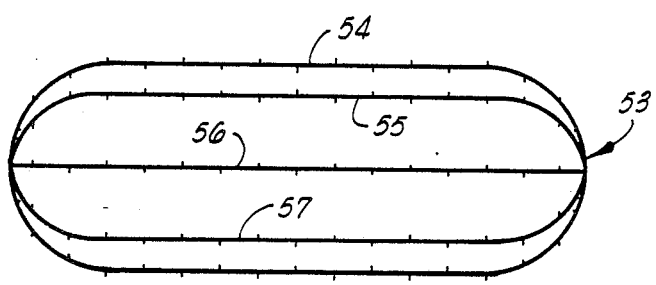

FIG. 9a is a schematic illustration of an alternate evacuation tubing network which can be utilized on a round-ended tank system of the type shown in FIG. 1, but differing in the orientation of the tubing in the network from that operation which is depicted in FIG. 8a.

Figure 9B:
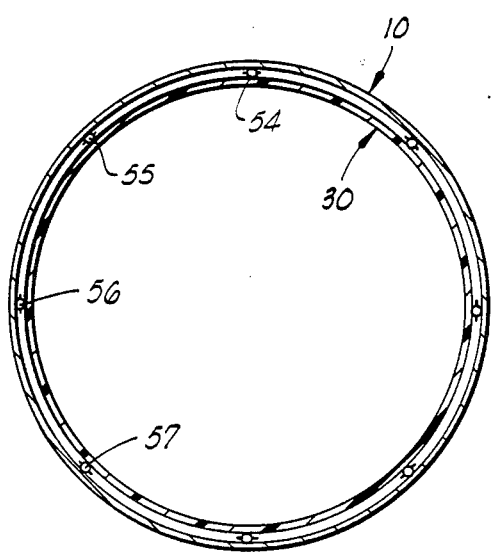

FIG. 9b is a sectional view similar to the sectional view depicted in FIG. 8b, but illustrating the appearance, in section, of the evacuation tubing network depicted in FIG. 9a as it is positioned between the flexible inner tank and the rigid outer tank constructed in accordance with one embodiment of the invention.

FIG. 10a is a sectional view taken along line 10a—10a of FIG. 2, and illustrating the relative arrangement of inner and outer tanks of a preferred embodiment of the invention.

FIG. 10b is an enlarged sectional view of a structural detail which is enlarged from the section shown in FIG. 10a in order to illustrate the relationship of the rigid, cylindrical, external tank to the flexible internal tank or liner which is placed therewithin in the preferred embodiment.

FIG. 10c is a view in elevation of a fragment of the embossed external surface of a preferred flexible internal tank, which surface facilitates the adherence of the liner to the internal wall of the rigid outer tank.

FIG. 11 is an enlarged, sectional view of a continuous liquid sensing and monitoring subassembly used in conjunction with the flexible internal tank employed in the invention.

FIG. 12 is a sectional view taken along line 12—12 of FIG. 11.

FIG. 13 is a schematic illustration of the complete preferred embodiment tank system, including the associated liquid monitoring and vacuum loss detection system.

FIG. 14 depicts a liquid trap system which can be utilized with the less preferred embodiment of the invention depicted in FIGS. 1, 7, 8a and 8b of the drawings.

FIG. 15 is a schematic illustration of the manner in which the liquid monitoring and vacuum loss detection system can be utilized for purposes of simultaneously monitoring the fluid integrity of three different storage tank systems constructed in accordance with the invention.

DETAILED DESCRIPTION OF PREFERRED EMBODIMENTS OF THE INVENTION

Referring initially to FIG. 1 of the drawings, shown therein is a storage tank system 9 constructed in accordance with the present invention. In a frequent and conventional, though non-limiting, utilization, the storage tank system is located underground and is used to contain corrosive or volatile liquid materials. A typical utilization of this type is for the storage of gasoline or diesel oil. The storage tank system can also be used above the ground, however, and it can be used to contain gases of various types.

The tank system 9 includes an external tank 10 which is constructed of a rigid material, such as steel or a ferrous meetal, but which can also, in some instances, be constructed of fiberglass or a rigid or semi-rigid synthetic resin. The tank 10 in this embodiment is illustrated as being of generally cylindrical configuration having rounded, semi-spherical ends. The rigid external tank 10 is provided with a pair of horizontally spaced openings or manholes located at the upper side of the tank 10. These manholes are designated generally by reference numerals 12 and 14. The manhole structures may vary in different embodiments of the invention, but a preferred construction will be hereinafter described in detail. Each of the manholes 12 and 14 communicates with a relatively large manway 15 extending to the surface of the ground and facilitating access to the respective manhole 12 or 14.

As will be hereinafter explained, the geometric configuration of the external tank 10 can vary from that illustrated in FIG. 1, and in a preferred embodiment is a flat-ended tank, as contrasted with round-ended tank of FIG. 1. In other forms, the rigid external tank may be spherical, or even of rectangular parallelepiped configuration. A preferred form of tank is illustrated in FIG. 2 of the drawings and will be hereinafter described.

Disposed at one point along the lower end portion of one end of the external tank 10 is a small, outwardly protruding tubular neck 16 which is closed by a plate 18 bolted to the neck by means of bolts 20 as shown in FIGS. 1 and 7. The plate 18 has a fitting 21 thereon which facilitates connection to a tubing or conduit 22 which extends to a vacuum and monitoring system hereinafter described. The conduit 22 is connected at its end adjacent the external tank 10 through a T-fitting 24 (see FIG. 7) to a perforated suction tubing 26 forming a part of a suction pipe network or subassembly designated generally by reference numeral 28, and hereinafter described in greater detail as reference is made to FIGS. 8a and 8b of the drawings.

Disposed within the external rigid tank 10 and inwardly of the suction pipe network 28 is a flexible liner or inner tank 30 which, in its operative position, is complementary in configuration to the internal surface of the external rigid tank 10, and its operative status, defines with the external tank a space located between the external tank and the inner tank. The flexible internal tank 30 is positioned to be drawn by the suction pipe network into close proximity to the inner surface of the external tank 10 in a manner hereinafter described. Where this illustrated system is used so as to employ a suction pipe network for drawing the flexible liner into close proximity to the inner surface of the external tank, the flexible internal tank will often have a smooth, external surface which prevents realization of the great advantage afforded by an embossed or roughened surface from being realized. Such a flexible internal tank having an embossed, external surface is hereinafter described when reference is made to the preferred embodiment of the invention illustrated in FIG. 2.

As a typical utilization of a storage tank system constructed in accordance with the present invention, the subterranean storage of gasoline may be mentioned. This is a particularly appropriate example of usage because there have been estimated to be over 10 million of such tanks in use in the United States, and of these, which have conventionally been constructed as a single-walled steel tank in the past, it is estimated that about thirty five percent leak to some extent at this time, and an additional twenty five percent will leak in the next ten years. This, of course, constitutes a serious and major threat of ground water pollution and environmental contamination in general. In a typical gasoline storage tank of the sort employed at automobile service stations, a float vent valve 32 is provided and is connected through the steel cover plate 33 of the manhole 14 to a return line 34. A pump 36 is, of course, provided for pumping the gasoline to the surface pumps for sale to motorists. Another vent pipe, typically in the form of a four-inch galvanized steel riser 38, is connected to another float vent valve 40. A fill tube 42 is provided for filling the storage tank from time-to-time.

A basic objective of the present invention is to provide a high integrity tank system which allows continuous monitoring of the integrity of the containment afforded by the tank, and continuously apprises an operator of any leakage of the contents of the tank to the surrounding earth. The monitoring assembly used in the system will also afford an indication of the development of fractures or leaks in a rigid external tank even where such occurs before the overall tank system losses its integrity as a result of loss of containment capability and integrity by the (flexible) internal tank.

The suction pipe network 28 utilized in the embodiment of the invention illustrated in FIG. 1 includes the elongated perforated tubing 26 which typically can be a one-half inch diameter tubing constructed of a flexible material which nevertheless is sufficiently rigid, and is possessed of sufficient mechanical strength, to withstand, without collapsing, the vacuum which is to be internally applied. The elongated perforated tubing 26 extends around the tank 10 in the manner illustrated in FIGS. 1 and 8a. Appropriate loops are provided at the location of the manholes 12 and 14 in order to encircle and bypass the manholes. In a preferred embodiment of the invention, the tubing 26 defines a plurality of spaced perforations 43 which open, in alternating sequence, at opposite sides of the tubing.

At spaced intervals along the tubing 26, a plurality of transverse circular evacuation tubes are connected as shown in FIGS. 8a and 8b to the tubing 26 and are located in diametric planes of the tank. In the illustrated embodiment of the suction tubing network, as such is shown in FIGS. 1, 8a and 8b, two of the transverse evacuation tubes 46 and 48 are utilized, and are disposed in longitudinally-spaced, diametric planes, but it will be understood that in embodiments of the invention where a suction piping network is needed, a greater number of these transversely extending tubes located in diametric planes can be employed if desired. Also, as hereinafter explained, it is possible to construct the suction piping network so that none of these circular transversely extending tubes are utilized, but rather, a plurality of longitudinally extending, substantially parallel tubes can be utilized to form the network.

As illustrated in FIGS. 8a and 8b, each transverse circular tube 46 or 48 is provided with many small perforations 50 and 52 spaced along the tubing at regular intervals. These perforations 50 alternate with the perforations 52 and are alternately faced in the direction in which they open, Thus the perforations 50 open toward one end of the tank 10, and the perforations 52, which alternate with the perforations 50, open toward the opposite end of the tank. This enables the space between the flexible internal tank 30 and the rigid external tank 10 to be evacuated by means of the suction pipe network 28 in an efficient and rapid manner.

Each of the transverse circular suction or evacuation tubings 46 and 48 preferably has an inside diameter of about one-quarter inch, and the perforations 50 and 52 formed in these tubings are preferably spaced from each other along the tubings at intervals of about six inches.

When suction is applied to the tubing 26 via the tubing 22 by the use of an appropriate vacuum system, the space between the flexible inner tank 30 and the rigid outer tank 10 is evacuated, and the flexible liner is drawn against the internal surface of the tank wall. This is preferably carried out after the liner or inner tank 30 has been tested, and after it has been placed within the external tank 10 and forced close to the tank wall by positive pressure placed within the liner.

In FIGS. 9a and 9b of the drawings, an alternate-type of suction pipe network subassembly 53 is depicted and includes a plurality of longitudinally extending, substantially parallel suction tubings 54, 55, 56 and 57 which extend around the tank in a generally longitudinal direction. Each tubing 54–57 is of oval configuration and lies in a plane which extends through the longitudinal axis of the tank. In this arrangement, the transverse suction tubes 46 and 48 are not utilized, but the suction network subassembly 53 still functions to draw the flexible inner tank 30 against the inner surface of the rigid outer tank 10 by the development of a substantial vacuum in the space between the inner tank and the outer tank.

In one form of the invention, the liner may be provided with a plurality of small interrupted ribs or a regular grid of raised protuberances disposed on the outer surface thereof so as to permit the vacuum to act over substantially the entire surface of the liner in an even manner, and to draw the liner evenly against the tank wall. The most suitable flexible liner or internal tank material which has been found to the present time, and which gives excellent results, is a flexible liner constructed of a synthetic resin which is compatible with the contents of the tank and which has a thickness of about 60 mils, and having an embossed external surface. The system which uses this preferred type of flexible internal tank is depicted in FIG. 2, and is hereinafter described in greater detail.

A preferred method of constructing the manholes 12 and 14 is illustrated in FIGS. 3 and 4. Each of these manholes 12 and 14 includes a tubular, generally cylindrical neck 58 which projects radially outwardly from the outer surface of the rigid, external tank 10. Each cylindrical neck 58 carries a peripheral, radially extending, annular flange 60 at its open outer end. The annular flange 60 carries a plurality of circumferentially spaced holes 62 through which the shanks of a first group of bolts 64 can be passed for engagement with nuts 63 as hereinafter explained. The annular flange 60 also carries another group of second holes 65 which are circumferentially alternated with the holes 62 and utilized for a purpose hereinafter described.

Resting flatly upon the outwardly facing surface of the annular flange 60 is a suitable flexible annular gasket 66. The annular gasket 66 may have preformed bolt holes 67 therein which are positioned to register with the bolt holes 62 in the annular flange 60 so that bolts can be extended through the gasket. A second group of bolt holes aligned with the bolt holes 65 may also be formed in the gasket 66. The holes in this second group are alternated in their circumferential spacing with the holes 67 in said first group in the gasket 66.

The flexible internal tank 30 also carries at each of the manholes 12 and 14, a radially outwardly extending tubular cylindrical neck 68 which has an integrally formed, radially extending annular flange 70 at the outer end thereof. The annular flange 70 and neck 68 are dimensioned to mate with and fit snugly against the neck 58 on the rigid external tank 10, and the annular flange 60 carried thereon. Positioned radially outwardly from, and superimposed upon, the annular flange 70 formed on the flexible inner tank 30 is a second flexible annular gasket 72 which also has a plurality of circumferentially spaced first bolt holes 74 therethrough at locations to register with the first bolt holes 67 formed through the first gasket 66 and in the annular flange 60. A second group of bolt holes 75 is also provided at positions such that the several holes thereof are aligned with the second holes 65 in the flange 60.

Located outwardly of the second gasket 72 and superimposed thereupon is a rigid annular plate 76 which is dimensioned substantially identically to the annular flange 60. The rigid plate 76 carries a first group of circumferentially spaced bolt holes 78 which are positioned to register with the holes through the two gaskets and through the annular flange 60 so as to permit the bolts 64 in the first group to be extended through the registered holes, and through the holes 62 in the flange 60 to then be engaged with one of the nuts 63. A second group of bolt holes 79 is also formed through the annular plate 76 in alignment with the holes 65 in flange 60.

Finally, a third and outer annular gasket 80 is clamped by the bolts 64 tightly against the plate 76. The gasket 80 also carries holes for accommodating a second group of bolts to which reference is hereinafter made, and the function of these bolts will be hereinafter described.

When the bolts 64 are passed through the holes 62 in the flange 60, and are engaged with the nuts 63 as shown in FIG. 4, the annular plate 76 is clamped firmly against the gaskets so as to compress the second gasket 72 and the first gasket 66 against the opposite sides of the flange 70 of the flexible internal tank 30. The gaskets 66 and 72 and the flange 70 are also clamped tightly against the rigid metallic flange 60.

It will be perceived that through the use of the bolts 64 in the described manhole construction, the flexible inner tank 30 is secured in position, even when a manhole is opened by removal of the cover, and that such cover removal, when effected, does not disturb the operating position of the inner tank or liner, nor does it in any way disrupt the fluid tight integrity of the inner tank. It will also be perceived that the space which exists between the flexible internal tank 30 and the rigid external tank 10 remains sealed at the located of the manholes, and thus no opportunity is afforded for leakage into this space to occur at this location.

It will be perceived that the use of the bolts 64 and the arrangements of gaskets 66, 72 and 80, in combination with the annular flange 70 carried on the neck of the inner tank 30, and the rigid, radially extending annular flange 60 carried on the cylindrical neck 58 of the rigid external tank 10, assure that a tight seal of lasting integrity is at all times maintained between this terminal portion of the flexible inner tank and the rigid outer tank. No leakage therefore occurs into the space between the flexible inner tank 30 and the rigid outer tank 10 at this location, even when the manhole cover which is provided is removed.

With respect to the covers provided for the manholes 12 and 14, one of such covers is illustrated in an enlarged depiction in FIGS. 3 and 5 and is there denominated by reference numeral 82. The manhole cover 82 is a large circular or disc-shaped rigid metallic plate which has an outer periphery which is in registry with the outer periphery of the rigid annular flange 60 carried at the outer end of the neck 58 on the rigid external tank 10. Manhole cover 82 has openings 83 formed through the cover in a number sufficient to accommodate the various vent pipes, fill pipes and other fittings required. Such openings 83 are illustrated in FIGS. 5 and 6 of the drawings where two forms of such covers with the openings arranged in staggered triangular array (FIG. 5) and in aligned form (FIG. 6) are shown. The rigid manhole cover plates 82 are provided around the periphery thereof with two sets of bolt holes in locations heretofore generally described, and positioned to register with the first and second sets of bolt holes through the gaskets and flanges as hereinbefore described.

As has been indicated, the first set of bolt holes 62 are for the accommodation of bolts 64. Aligned with the holes 62 in the flange 60 are relatively large holes 84 in the manhole covers, and the latter holes merely function to spacially accommodate the heads of the bolts 64, as illustrated in FIG. 4. These bolts 64 function to retain the liner flange 70 in its sealed status, and are not loosened or in any way manipulated at times when the manhole cover plate 82 is removed to provide access to the interior of the storage tank system.

For the purpose of securing the manhole cover 82 in position, a second group of bolt holes 85 is provided in the cover 82 and functions to receive the second group of bolts 86 which are headed to prevent the bolts from passing through the holes 85 in the cover. These second bolts 86 extend through the second group of bolt holes 65 carried by the rigid annular flange 60 on the neck 58 of the external tank 10, and are secured by nuts 87. The bolts 86 are removed at such time as it is desired to remove the manhole cover 82 to permit access to the interior of the storage tank system. As previously indicated, this construction of the manholes assures that each manhole cover can be quickly and easily removed without in any way disturbing the integrity of the seal which is provided against the flange 70 carried on the neck 68 of the internal tank 30.

In FIGS. 2 and 10a–10c, a preferred embodiment of the storage tank system is illustrated, including a preferred form of flexible inner tank construction denominated by reference numeral 88. The flexible inner tank 88 is positioned inside a flat ended, rigid external tank 90 as in the case of the inner tank 30 previously described. The preferred flexible inner tank 88, is provided with an embossed or reticulated outer peripheral surface. The appearance of this surface is best illustrated in FIG. 10c where it will be noted that a series of interconnected vanes or ribs 91 extend randomly on the surface. These vanes or ribs are of varying thicknesses, so that one may be in contact with the internal surface of the external tank 90 at some points, but be spaced therefrom at other points. This permits a uniform vacuum to be developed in the entire space between the flexible inner tank or liner 88 and the rigid external tank 90 in the manner hereinafter described. The vacuum acts over the entire outer surface of the inner tank 88 and draws the inner tank tightly and evenly against the entire inner surface of the rigid outer tank 90. Where the preferred embodiment of the invention is utilized, including the flexible inner tank having an embossed outer surface allowing it to be more effectively drawn against the internal surface of the tank by vacuum, the necks which are formed on the flexible inner tank for extension through the manholes can, if desired, be provided with a smooth external surface in order to allow the seal against the sides of the manhole necks of the rigid external tank to be more effectively established.

It is pointed out that in yet another embodiment of the invention, not illustrated, the flexible inner tank may have, in addition to the embossed outer surface having randomly extending, variable thickness ribs or ridges formed thereon, a plurality of patterned ribs in the form of a uniform grid. These act in conjunction with the embossed surface to facilitate the fast adherence of the flexible inner tank to the internal wall of the outer tank.

FIGS. 11, 12 and 13 illustrate a preferred system for evacuating the space between the flexible inner tank 88 and the rigid outer tank 90, and for continuously monitoring the integrity of the inner tank and the magnitude of the vacuum developed between the inner tank and outer tank. At the bottom of the storage tank system, a rigid flat, horizontally extending plate 92 having a plurality of perforations 94 formed therethrough is secured across the inside of the outer tank 90 along a chord of the circular transverse cross-section of the tank. This chordal orientation of the plate 92 assures that there will be a small opening at the axially inner side of the tank at a location indicated by reference numeral 96 in FIG. 12. Thus, the underside of the perforated plate 92 is placed in communication with the space between the flexible internal tank 88 and the rigid external tank 90.

It should be pointed out that the perforated plate 92 is positioned immediately adjacent an end of the tank 90 illustrated in FIG. 2 which is purposely positioned slightly lower than the opposite end of the storage tank. In this way, any liquid which has leaked between the flexible internal tank 88 and the rigid external tank 90 tends to gravitate toward the end of the storage tank assembly in which the perforated plate 92 is located, and will there be able to pass beneath the perforated plate.

At a location which is in general alignment with the perforations 94 formed through the plate 92, the wall of the external tank 90 carries a plurality of perforations 100 which place the interior of the external tank 90 in communication with the interior of a liquid collection container or sump chamber 104 via a plurality of perforations 106 formed in a top wall of this sump. The sump chamber 104 is secured by welding or other suitable means to the lower side of the storage tank and is a high integrity chamber which does not leak gases or liquids to the earth with which it is surrounded.

Projecting upwardly from the top side of the sump chamber 104 is a vertically extending riser pipe 110 constructed of steel or rigid plastic material. The riser pipe 110 extends parallel to the substantially flat end wall 90a of the rigid external tank 90 and is retained in its position relative to the storage tank by a pair of steel plate supporting brackets 112 and 114 which are welded to the tank and to the riser pipe. The interior of the sump chamber 104 communicates with the interior of the riser pipe 110 so that vacuum applied to the interior riser pipe evacuates the sump chamber 104.

Positioned concentrically within the riser pipe, and projecting vertically from the top of the riser pipe downwardly therethrough into the interior of the sump chamber 104 is a metallic or plastic conduit 116. The conduit 116 carries an appropriate liquid-sensing device at its lower end, which, in the embodiment of the invention illustrated in FIG. 11, is a float switch 118 which is responsive to the presence of liquid in the lower portion of the sump chamber 104. As will hereinafter be explained, other types of liquid, or moisture, or even gas sensing instruments or devices can be suspended within the sump chamber 104 on the lower end of the conduit 116, and may be communicated with suitable instrumentation to provide a readout of the sensed parameter by means of electrical leads or the like extended through the conduit 116.

Near its upper end, the riser pipe 110 is connected into a metallic or plastic tee fitting 124. The tee fitting 124 is connected through a short sub or tubing 122 of substantially the same diameter as the riser pipe to a reducing coupling 126 disposed at the upper end of the sub. The internal conduit 116, which carries the electrical conduit leads from the float switch 118, projects through the reducing coupling 126 and is connected through an elbow 128, suitable union 130 and adapter 132 to a 1" conduit 133 by which the leads from the float switch are conveyed to an alarm system to be subsequently discussed. A 1" tubing 134 is connected through a suitable adapter 136 to the neck of the tee 124, and is used to evacuate the riser pipe 110 and the sump chamber 104.

As shown in FIG. 13, the upper end of the riser pipe 110 and the internal conduit 116 where it emerges from the reducing coupling 126 are positioned within a manway 138 having a suitable cover which can be removed to give access to the riser pipe and the internal conduit for maintenance purposes if such be needed.

It should be pointed out, before proceeding with a description of the vacuum generation and monitoring system of the invention, that a liquid detection system corresponding generally in its function to the sump chamber 104, riser pipe 110 and internal conduit 116, except for its preferred use in conjunction with a round-ended storage tank system constructed according to the embodiment illustrated in FIG. 1, has been depicted in FIG. 14 of the drawings. In this system, the tubing or conduit 22 is connected to a nipple or lateral fitting carried on the side of a riser pipe 140 which is connected at its lower end of a liquid trap 142. An internal conduit 144 is also provided in this system, and extends concentrically downwardly in the riser pipe to support a float switch 146 or other suitable liquid-sensing device at its lower end. The riser pipe and internal conduit also extend into a manway 148 disposed adjacent the ground surface 150 to permit access to be had to the upper end of this subassembly.

The type of device used as the liquid sensor mounted at the lower end of either of the conduits 116 or 144 can vary widely, and a number of instruments capable of sensing the presence of liquid can be used. As a general characteristic of the device, it must be capable of continuously sensing the presence of even a relatively small amount of liquid which, in the case of the embodiment of the invention illustrated in FIGS. 2, 10a–10c and 11, has passed through the perforations 106 in the external tank 90 and entered the reservoir chamber 104. The system here can also function as an observation well, and in case of failure of the liquid sensor, it can be easily removed through the manway 138 and replaced in a short period of time.

As liquid-sensing devices which function as alternates to the float switch 118, a light refraction sensor can be utilized, or an electrical conductivity meter, or a pressure sensing device. A chemical system capable of detecting the presence of moisture can also be employed. If liquid begins to accumulate in the sump chamber 104, or in liquid trap 142, the sensor device will be activated and an electrical signal will be transmitted to an alarm siren or light 154 as illustrated in FIG. 13. In other words, when the liquid sensor device 118 or 146 is activated by the presence of liquid, a switch will close the circuit and an audible or visible alarm is then automatically activated. If desired, the alarm system can be connected into a main electric control panel, hereinafter discussed, so as to immediately interrupt the vacuum being applied to the storage tank system if liquid leakage is detected.

To briefly describe several of the systems which can be used for detecting liquid in the sump chamber 104 or liquid trap 142, a float switch 118 of the type illustrated in the drawings has a moving, floating part (not visible) which rises and falls with the liquid level in the sump chamber, and upon moving upwardly upon the development of rising liquid within the sump chamber, closes the switch to activate the alarm system.

A light refraction liquid sensor utilizes a source of light which is emitted and then reflected back to the light sensor at a time when the sensor is not in contact with liquid. When the sensor does make contact with liquid, the emitted light is refracted into the liquid, rather than being reflected back to the sensor. This diversion of the light by refraction causes the sensor switch to be closed, and an alarm to be activated to indicate the presence of liquid.

In the case of a pressure-sensing device, the pressure head which is produced by the presence of any significant amount of liquid is sensed by a pressure device, such as a diaphragm. An air flow generated and pumped to the liquid receiver then is responsive to the presence of liquid by a drop in pressure which causes a switch to be activated.

Another system which permits the liquid to be trapped and subsequently very conveniently tested is a vapor trap or condenser, such as a dry ice trap hereinafter described in greater detail. In the described dry ice trap, installed in the vacuum line as hereinafter described, any vapor is trapped and condensed by the use of dry ice. The trapped liquid can then be analyzed.

The vacuum developing and surveillance or monitoring system is illustrated in detail in FIGS. 11 and 13 of the drawings, along with the liquid alarm or signaling device 154 hereinbefore described. The vacuum developing and monitoring system includes the vacuum pipe or conduit 134 hereinbefore described as being connected to the tee 124 through the coupling 136. A suitable ball valve 156 is provided in the line 134, and an atmosphere vent line 158 carrying a ball valve 160 therein is teed off of the vacuum conduit 134 just before it enters a large vacuum receiver or tank 162. The vacuum chamber 162 can typically have a capacity of about 30 gallons, and acts as a reservoir to assure the constant application of vacuum to the space between the liner 30 or 88 and the external tank 10 or 90. The vacuum pump 172 has, of course, initially established the vacuum in the system.

The vacuum tank 162 has a vacuum breaker 164 carried thereon and also has a vacuum gauge 166 mounted on the side thereof to provide an accurate indication of the vacuum in the vacuum tank. The vacuum tank 162 also has a vacuum pressure switch 168 mounted thereon and connected by a suitable electrical circuit to the electrical control panel 170 which in turn is connected to a vacuum pump 172. The pressure switch 168 is preferably one which can operate in the range of from about 0.1 in. Hg to about 5.0 in. Hg. This system allows the vacuum pump 172 to be started and stopped in accordance with the pressure registered on the vacuum pressure switch 168, as this pressure fluctuates or cycles between pre-selected lower and upper limits of vacuum set on the switch. The vacuum pump is started and stopped, respectively, when these limits are reached. The vacuum pump 172 can be a vane pump, rotary pump or jet pump designed to operate in the range of from about 0.5 in. Hg to about 10 in. Hg. It should be pointed out that the necessary vacuum can also be developed by other means, such as for example, an eductor connected to an existing high pressure water line of a pneumatic compressor.

The electric control panel 170 preferably has associated therewith, a counter 174 which functions to automatically register the number of times that the system is cycled during its operation. A cycle is defined as the time that is required for the pressure to fall from a maximum vacuum (minimum pressure), when initially developed and as sensed by the vacuum pressure switch 168, to a minimum tolerable vacuum (maximum pressure), also as sensed by the vacuum pressure switch. At the latter time, the vacuum pump 172 is restarted by signal from the electric control panel, and again evacuates the space between the flexible inner tank 88 and the rigid outer tank 90 to increase the magnitude of the vacuum between the inner and outer tanks up to the maximum amount of vacuum determined by the upper limit set on the vacuum pressure switch 168. Between the vacuum tank 162 and the vacuum pump 172, a ball valve 176 and a suitable check valve 178 are disposed in a connecting conduit or line 180 by which the vacuum pump 172 is connected to the vacuum tank 162.

After the storage tank system is installed at its subterranean location, the vacuum which is required in order to keep the flexible inner tank 88 tight against the rigid external tank 90 is provided by the vacuum pump 172. The pressure switch 168, in conjunction and cooperation with the electric control panel 170, automatically controls the magnitude of the vacuum between the inner and outer tanks so as to keep this vacuum between the two previously described pre-set levels which can be referred to as the high level and the low level. A vacuum of about 2 p.s.i. (4 in. of Hg) is generally maintained as the preferred mean level of pressure between the flexible inner tank and the rigid outer tank.

FIG. 16 of the drawings illustrates a vapor trap or knock-out pot which can be utilized to collect liquid or to detect condensible vapor leakage into the space between the inner and outer tanks. The illustrated trap or vapor knock-out pot tank subassembly, when employed, can be beneficially utilized in the system in conjunction with a diaphragm-type vacuum gauge, as is illustrated. A flexible vacuum hose 182, which can typically be of about ¼" inside diameter, is connected via a valved fitting 180 to the conduit 22 to thereby receive gases (or liquid) from the space between the outer tank 10 and flexible liner 30. The hose 182 could also be connected via the fitting 180 to the conduit 134 in that embodiment of the invention. The hose 182 is connected at its other end to a dry ice trap subassembly, designated generally by reference numeral 183. The dry ice trap assembly 183 includes a pair of serially interconnected, dry ice-acetone condensing elements 184 and 185, each of which provides an upwardly opening tube 186 for holding a mixture of dry ice and acetone 190. The tubes 186 are supported on a suitable rack or stand 191. The condensing elements are interconnected by a tubular element 187. The lower part 192 of each of the condensing elements 184 and 185 receives any condensate derived from any condensible gas which passes through the dry ice trap. Between the dry ice trap subassembly 183 and a diaphragm-type vacuum gauge 193, a vacuum tubing 194 is extended, and includes a tee 195 by means of which a bleeder valve 196 can be utilized to admit a controlled amount of air to the tubing 194. The bleeder valve 196 can be permanently capped by a cap 198 if desired.

Leaks can often be detected by frequently monitoring the dry ice trap knock-out pots. If a leak develops at a location within the storage tank which is below the level of the liquid stored therein, the knock-out pots will be quickly filled with liquid of the type stored. If the liner leak occurs above the liquid level, then vapors are drawn into the system and condensed, and the result is an accumulation of liquid product recovered in the knock-out pots.

Whatever form of cold trap is employed, the trap will be capable of condensing hydrocarbon vapors, as well as water vapor, and will use as a refrigerant, either solid carbon dioxide, or liquid nitrogen, or a combination of liquid carbon dioxide and acetone, or any similar, equally effective refrigerant. The cold trap is preferably equipped with a drainage system, and if possible, should be equipped with a visual gauge to monitor the condensate.

USE AND OPERATION OF THE INVENTION

Initially, the flexible inner tank or liner 30 is constructed in conformity to the internal dimensions of the external tank 10 into which it is to be placed. Once the flexible inner tank 30 has been constructed to these dimensions, it is then tested with positive pressure after first sealing the manhole openings by fusing plastic closure plates of flexible plastic material across the inner tank manhole openings, except for an inflation opening or passageway formed at an appropriate location to admit air under pressure to the interior of the flexible tank. This initial testing is done before the inner tank 30 is positioned within the external tank 10.

After the initial positive pressure test, and correction of any leak discovered by appropriate repair as may be needed to alleviate such leaking, the inner tank 30 is deflated and is placed inside the rigid external tank 10 by passing the inner tank through one of the manholes 12 or 14 into the interior of the external tank. In the case of an entirely new storage tank assembly this is accomplished prior to the time that the external tank 10 is placed in its selected operative subterranean position, as illustrated in FIGS. 1 and 2. It should be pointed out that at this time and prior to transport to the permanent situs for installation, the rigid external tank 10 is also tested by suitable positive pressure testing, and is repaired as necessary.

After the flexible tank or liner 30 has been introduced through one of the manholes 12 or 14 into the rigid external tank 10, a positive pressure is again developed interiorly in the liner to force it to expand into contact with the internal surface of the wall of the external tank. The ability of the composite, double-walled storage tank to hold this negative pressure is then again tested. After running the internal, in-place testing of the liner, the flexible manhole cover test plates (not shown) are cut away from the liner, and the flanges 70 around the neck portions 68 of the liner which extend through the necks 58 forming a part of the manholes are secured to the external tank flanges 60, using the bolted gasketing and annular plate system hereinbefore described. Each liner flange 70 is thus bolted to the respective external tank manhole flange 60, with the intervening gaskets cooperating to form a tight fluid seal preventing the entrance of air into the space between the liner or inner tank and the rigid external tank.

A vacuum is next developed between the flexible inner tank 30 and the rigid external tank 10 to remove the air from this space, and to permit the integrity of the entire compound tank system to be tested under several varying levels of vacuum. Pneumatic or mechanical devices, such as diaphragm gauges, are used to detect any initial leaking due to inadequate sealing around the manhole flanges, or any other leakage which causes the space between the inner tank 30 and the external tank 10 to loose high vacuum integrity. If leaking is detected, this can usually be corrected by appropriate application of sealant to the flexible inner tank at the location of the leak.

After completing this testing, and being assured that the inner tank is of high integrity and the seals are functioning properly, the vacuum pump 172 used to develop the vacuum between the inner tank and the outer tank is disconnected from the system by means of a suitable ball check valve. The entire system can then be transported to the field, although if desired, the vacuum pump, or even the vacuum tank can be totally removed or isolated from the storage tank if desired.

After arrival at the situs where the tank is to be installed and used, a suitable excavation is formed for receiving the tank and the tank is installed. All fittings are connected and then a final test is carried out in which a relatively high vacuum is applied to the space between the flexible inner tank 30 and the rigid outer tank 10.

As will by now be clearly understood, the vacuum required to keep the inner tank 30 pressed tightly against the internal surface of the tank wall of the rigid outer tank 10 is produced by the vacuum pump 172. The pressure switch 168, in conjunction with the electrical control panel 170, will automatically control the system pressure so as to maintain the vacuum between the liner and the external tank within a selected range which is preset into the pressure switch and electrical control panel.

The system is initially started manually by throwing an appropriate starter switch (not shown) on the electric control panel 170. After the vacuum pump 172 is started by the throwing of the switch, the operation of the system then becomes automatic. At the time that the vacuum pump 172 is started, the two check valves 178 and 179 are automatically opened. When the high level or maximum preset vacuum is reached, the pressure switch 168 is actuated to open the electric pump control circuit, and the pump 172 is therefore stopped as a result of interruption of the necessary operating power. The check valves 178 and 179 automatically close, isolating the vacuum pump 172 from the evacuated system.

When the vacuum between the flexible inner tank 30 and the rigid outer tank 10 ultimately drops to the low level of vacuum which has been set upon the vacuum switch 168 and the control panel 170, the pressure switch closes the electrical circuit via the control panel, and the pump 172 is started again to regenerate the vacuum between the flexible inner tank or liner and the rigid external tank.

Each time the pressure switch 168 completes a cycle by opening and closing the electrical circuit to the vacuum pump, an electric counter 174 associated with the control panel 170 records or counts that cycle, and a cumulative figure indicating the total number of cycles through which the system has passed can be registered on the counter. In other words, a cycle indicates, by definition, that the vacuum has dropped from the high level down to the low level, and it is then necessary to restore the vacuum by energization of the vacuum pump. This fact is used to detect any leakage of unacceptable character or magnitude into the space between the inner tank and the outer tank. If the counter 174 begins to record more cycles per unit of time than is usual as indicative of merely an acceptably slow tank leak or temperature change or the like, then there is a clear indication of unexpected and unacceptable leakage and loss of vacuum integrity. The leak causing the vacuum loss can be in either the flexible inner tank, or in the external rigid tank so as, in the latter case, to admit fluids into the evacuated spaced from the surrounding earth.

If, for any reason, there is a failure of the system and especially if loss of vacuum develops, the vacuum pump will be re-started, and will tend to regenerate the vacuum until the necessary repairs can be made in the storage system. If there should, for any reason, be a malfunction of the monitoring and control system such that excessive vacuum develops in the space between the flexible inner tank and outer tank, the vacuum breaker 164 installed on the vacuum tank 162 will open, and the excessive vacuum will be relieved. An alarm system for such excessive pressure can be incorporated in the system (but is not here illustrated in the drawings), as well as can an automatic stopping of the vacuum pump at this time by means of another pressure switch.

Although the automatic monitoring system described is used in the preferred embodiment of the invention, it will be understood that the system can be operated manually by eliminating the pressure switch and the electric panel and the associated counter, by simply using the diaphragm gauges or other sensitive vacuum gauges mounted on the vacuum tank 162 to provide a visual indication of the need for manually periodically restarting the pressure pump to restore vacuum to the system. It is very helpful, however, to have the counter 174 included in the system so that an accurate record can be maintained of the number of times in a given period that it is necessary to start and recycle the vacuum pump. The rate of leakage is thereby more certainly and positively indicated.

It should be pointed out that certain minute variations of pressure are normal and are expected to occur due to temperature changes, changes in the total liquid volume and hydrostatic head of liquid in the tank, and the rate of allowable slow leakage through joints and seals. Some gaseous leakage will even occur at a very slow rate through the rigid skin of the external tank as a result of the inherent porosity of certain metals, such as steel. The totality of the described resultant pressure changes are minor, however, in comparison to the vacuum loss caused by a serious and major leak.

If the flexible inner tank should somehow develop a leak as evidenced by a loss of vacuum shown by the monitoring system, the leak can generally be repaired by simply opening a manway, entering through the manhole to the interior of the tank after it has been emptied, and then applying appropriate sealing material to the leak so as to stop the leakage. Where there is inappropriate, or residual noxious vapors remaining inside the storage tank system make entry of personnel into the interior of the inner tank dangerous, the inner tank may be extricated from the rigid external tank through the manhole and the manway to the surface of the ground. After such removal, the tank can be repaired at the surface and then restored to its operative position.

It is important to note that leaky old tanks can be retro-fitted utilizing the principles of the present invention by simply forcing the flexible liner through a manhole or other opening into the old tank, and then, by the use of both vacuum and positive pressure, forcing the inner tank outwardly against the wall of the rigid external tank. The rigid external tank, though leaking badly, will normally have sufficient rigidity, as reinforced by the surrounding earth, to define a fairly precise form of enclosure to which a flexible liner can be conformed by appropriate application of internal pressure and attached by an adhesive to form a fluid tight outer tank system. A flexible inner tank can then be placed into the interior of the repaired tank system. The necessary vacuum is then developed between the first liner and the newly placed flexible inner tank, along with the application of positive pressure to the inner tank to force it into conforming contact with the initially positioned liner. In some instances, of course, it is possible to repair a leaking existing metallic tank before placing a flexible liner in it, and then to evacuate the intervening space.

The vacuum developing and monitoring system of the invention can be adapted to use in monitoring a plurality of fluid storage tanks constructed in accordance with the present invention. In FIG. 15 of the drawings, a system for mointoring three such storage tanks, 200, 202 and 204, is illustrated. The sump chambers of the liquid monitoring system employed in this manifolded system are designated, respectively, 206, 208 and 210, for the three fluid storage tanks 200, 202 and 204. The electrical leads to the alarm systems used to provide a visual or audible indication of leakage of liquid into one of the sump chambers 206-210 are indicated by reference numerals 212, 214 and 216, and are connected to alarm devices 218, 220 and 222, respectively, provided for the purpose of indicating a leaking liquid status at any one of the three storage tanks.

For the purpose of evacuating the space between the flexible inner tanks and the rigid external tanks of each of the fluid storage tank systems 200, 202 and 204, a single high capacity vacuum pump 224 is provided and functions in conjunction with a large vacuum tank 226. Suitable valves 228 and 230 are located between the vacuum pump 224 and the vacuum tank 226. A pressure switch 232 is provided on the vacuum tank 226 and functions, through an electrical control panel 234, to terminate the actuation of the vacuum pump 224 at any time that the magnitude of the vacuum developed within the system becomes excessively large.

The vacuum tank 226 is connected through a suitable check valve 236 to manifolding which includes a conduit 238 which extends ultimately to the fluid storage tank system 200. This manifolding also includes a conduit 240 which extends ultimately to the fluid storage tank system 202 and a conduit 242 which extends ultimately to the fluid storage tank system 204. Each of these conduits 238-242 has a pressure switch located therein which is of the type previously described as functioning to open and close at certain preselected upper and lower limits of vacuum. Such opening and closing develops a signal which will permit vacuum to be applied through the respective conduit to the respective fluid storage tank, or alternatively, interrupts the application of vacuum to the respective tank by closing a valve.

To this end, three pressure switches 244, 246 and 248 of the type described are provided. The pressure switch 244 is associated with the storage tank system 200, and is located in the conduit 238. This switch 244 functions to develop a signal, in conjunction with an associated control panel 250, which will electrically open and close a suitable solenoid valve 252. Counter 254 is connected to the control panel 250 and operates in conjunction with the control panel 250 and the pressure switch 244 to count and display an accumulated total of the number of on-off cycles which occur as a result of pressurization and de-pressurization of the tank system 200 in the manner hereinbefore described.

The same type of system is provided in the case of a control panel 256 connected to the pressure switch 246 and to a solenoid valve 258. The control panel 256 actuates a counter 260, in a manner and for the purpose hereinbefore described, as the storage tank system 202 cyclically undergoes pressurization and de-pressurization.

Finally, a control panel 262 is connected to the pressure switch 248 and functions to open and close a solenoid valve 264 to prevent further build up in pressure in the storage tank system 204 over a pressure level which actuates the pressure switch 248. A counter 266 registers the cycles of pressurization and de-pressurization occurring in the fluid storage tank 204.

It will be perceived that the lined tank system of the invention has several features which allow for superior operation and extended service life. Leaks can be detected prior to the time that a failure of the system has developed to the extent that the environment around the tank becomes contaminated. The liner, when it develops a leak or has become permeable to the liquid contained in the tank, can be quickly and easily replaced. This replacement of the liner can be accomplished without the necessity for excavating and replacing the tank, since the flexibility of the liner and the size of the manways provided enable the liner to be extricated from, and re-inserted in, the tank without difficulty.

The system further provides for continuous monitoring and leak detection of sufficient sensitivity that any unacceptable leakage is quickly known. It is also possible to easily adapt the system to automatic monitoring of the volume of the tank comtents, thereby eliminating the necessity for manual monitoring to accomplish inventory control.

The primary objective of the system is to provide a means for protecting the environment with maximum assurance. With new governmental regulations regarding the storage of hazardous materials and the expected further detailing and increase in the stringency of such regulations for regulated materials, it is of extreme importance that a system be designed which can insure environmental protection around the storage tank. The present system will essentially eliminate the potential for spills which contaminate the environment.

Although a preferred embodiment of the invention has been herein described in order to afford examples of the way the system is to be constructed in order to achieve the objectives sought, it will be understood that some variations in the illustrated and described structures can be made without departure from the basic principles which underlie the invention.

For example, in another embodiment of the invention, the piping system by which the space between the external tank and the flexible inner tank is connected to a source of vacuum can itself be constructed in a dual-walled arrangement. In other words, a pair of concentrically disposed pipes can be provided in order to assure that the effects of any leakage which might otherwise develop in a single pipe system are alleviated. Loss of the vacuum developed in the system is prevented by surrounding the internal, fluid-evacuating pipe with an external pipe. The external pipe is preferably a flexible primary pipe, and the internal, fluid-carrying pipe used for developing the vacuum is a rigid pipe. It is also preferable to provide a space or clearance between the two pipes.

Where the dual-walled or concentric pipe system is employed, and the space between the concentric pipes is evacuated, the vacuum monitoring and evacuating arrangement is such that the space which is evacuated between the concentric pipes can itself be individually tested and monitored continuously. It is thus possible to determine whether a leak has developed in the piping system, as distinguished from the space between the external tank and the internal liner or tank of the storage tank system.

In another embodiment of the invention, a continuous inventory control subassembly is added to the system. This subassembly is operative to detect the extent, if any, to which an amount of fluid originally stored in the tank is lost through leakage. Such inventory control subassembly will provide a continuous readout of the total volume of fluid in the tank, and, in systems where there are frequent discharges of fluid pumped from the tank, such as in a service station fuel storage tank, the amount by which the inventory is decreased as a result of pumping is also continuously monitored. The volumetric inventory readout provided thus takes into account, and makes allowance for, the amount of fluid delivered in this way from the total inventory within the tank.

With such inventory control, it is possible to detect leakage occurring from the flexible inner tank into the space between the inner tank and the outer tank as it results in a detectable decrease in inventory not accountable on the basis of evaporation, or as resulting from fluid pumped from the tank inventory into vehicles, or similar usages. The maintenance of an inventory control subassembly of the type described also affords the advantage of permitting fluid leakage into the space between the external tank and the internal tank to be differentiated as to location or source. Thus this subassembly allows leakage from the inner tank to be identified, in contradistinction to a leak resulting from openings or fractures which may have developed in the external tank. Loss of vacuum which is occurring at an unacceptably fast rate within the space between the two tanks is, of course, the result of a leak in the inner tank if the inventory control subassembly shows that the inventory of stored fluid is decreasing as a result of such leakage. On the other hand, if the inventory control subassembly shows that there is no decrease in the inventory as it is continuously monitored, then the loss of vacuum in the space between the tanks must necessarily be due to a leak which has developed in the outer tank.

Changes and innovations of the described types, in addition to others, are deemed to be circumscribed by the spirit and scope of the invention except as the same may be limited by the appended claims, or reasonable equivalents thereof.

What is claimed is:

1. A fluid storage tank system comprising:
   an external tank having an inner side and an outer side;
   a flexible inner tank positioned within and adjacent said external tank and defining with said external tank, a space therebetween;
   said flexible inner tank having a geometric configuration complementary to that of said external tank, and said inner tank having an interior and an exterior;
   registering access manholes in the inner and external tanks facilitating access to the interior of the inner tank so that said access manholes are registered;
   means for sealing the inner and external tanks to each other at the registering access manholes with a seal adequate to impart fluid tight integrity to the space between the inner and external tanks;
   means for removably closing said manholes and facilitating the selective opening of the registered manholes without affecting the integrity of the seal of the tanks to each other at the registering access manholes;
   means for reducing the pressure in said space between the tanks to a negative pressure below atmospheric pressure; and
   means for periodically automatically evacuating such space to restore the negative pressure therein to a predetermined level.

2. A fluid storage tank system as defined in claim 1 wherein said flexible inner tank is a synthetic resin membrane having a thickness of from about 20 mils to about 130 mils, and having an embossed, randomly reticulated surface facing, and in contact with, the inner side of said external tank.

3. A fluid storage tank system as defined in claim 2 wherein said means for periodically automatically evacuating said space comprises:
   an electrical circuit;
   a pressure switch in said electrical circuit responsive to a selected first, relatively high pressure level in said space to close said electrical circuit, and responsive to a selected second, relatively low pressure level corresponding to said predetermined level in said space to open said electrical circuit; and
   a vacuum pump electrically connected to said pressure switch and pneumatically connected to said space for starting up and evacuating said space when said pressure switch closes said electrical circuit, and for stopping when said pressure switch opens said electrical circuit.

4. A fluid storage tank system as defined in claim 3 and further characterized as including means for removably closing said manholes and facilitating the selective opening of the registering access manholes without affecting the integrity of the seal of the tanks to each other at the registering access manholes.

5. A fluid storage tank system as defined in claim 4 wherein said means for removably closing said manholes comprises:
   a rigid plate of a size sufficient to cover said access manholes; and
   bolts for releasably securing said rigid plate to said external tank, said bolts being releasable to permit said plate to be removed and to open said manholes without affecting, by the release of said bolts, the integrity of the seal of the tanks to each other at the registering access manholes.

6. A fluid storage tank system as defined in claim 2 wherein said synthetic resin inner tank is a material which is inert to hydrocarbons, including gasoline and diesel oil.

7. A fluid storage tank system as defined in claim 2 and further characterized as including means for continuously monitoring and visually indicating the level of sub-atmospheric pressure in said space.

8. A fluid storage tank system as defined in claim 2 wherein said means for reducing the pressure comprises:
a vacuum tank; and
a vacuum pump connected through said vacuum tank to said space between the inner and external tanks.

9. A fluid storage tank system as defined in claim 2 and further characterized as including means for removably closing said manholes and facilitating the selective opening of the registered access manholes without affecting the integrity of the seal of the tanks to each other at the registering access manholes.

10. A fluid storage tank system as defined in claim 2 and further characterized as including means connected to said periodically evacuating means for measuring the number of such periodic evacuations occurring in a certain, predetermined time interval.

11. A fluid storage tank as defined in claim 1 wherein said means for removably closing said registering manholes comprises:
a rigid plate of a size sufficient to cover said access manholes; and
bolts for releasably securing said rigid plate to said external tank.

12. A method of containing an environmentally deleterious fluid in a subterranean comprising the steps of:
placing a first container having an external wall, an internal wall, and having an opening thereinto in a subterranean excavation with the opening facing upwardly and accessible from above;
inserting a flexible liner which is inert to said fluid through the upwardly facing opening in said container, with the liner having an opening-defining neck therethrough mating with the opening through said container, and the remaining portion of said liner, which is in addition to said neck, being complementary in configuration to said first container facilitating positioning adjacent the internal wall of the first container when the liner is expanded to its fully opened, full dimensional configuration;
sealing said neck of the liner to said container at the location of the upwardly facing opening into said container, so that the opening defined by said liner neck registers with the upwardly facing opening in said container after said sealing is completed;
withdrawing air from between said liner and said first container to develop a subatmospheric pressure therebetween;
prior to, during or after the withdrawal of said air to develop said subatmospheric pressure between said liner and said first container, filling a major portion of the volume within said liner with said fluid;
continuously maintaining a selected range of subatmospheric pressure between said liner and said container;
continuously monitoring the pressure between said liner and said first container;
evacuating between the liner and the first container to maintain subatmospheric pressure between the liner and the first container at said predetermined limits.

13. The method as defined in claim 12 and further characterized as including the step of embossing the outer surface of said liner prior to insertion of said liner through said opening into said container, said embossing providing a random reticulated pattern of webs and ribs of randomly varying thickness and dimension on said outer surface whereby the pressure between said liner and said container is rapidly equalized between the liner and container at every location therebetween by reason of the communication of interstitial spaces between said randomly occurring webs and randomly occurring ribs with each other at all times.

14. The method as defined in claim 13 and further characterized as including the step of continuously maintaining access to the interior of said liner facilitating the addition to, or removal of, the fluid contained within said liner at a time while said subatmospheric pressure is maintained between said preselected limits within said space.

15. A fluid storage tank system comprising:
an external tank having an inner side and an outer side;
a flexible inner tank positioned within and adjacent said external tank and defining with said external tank, a space therebetween, said inner tank having a geometric configuration complementary to that of said external tank, and said inner tank having an interior and having an exterior;
registering access manholes in the inner and external tanks facilitating access to the interior of the inner tank so that said access manholes are registered with each other;
means for sealing the inner and external tanks to each other at the registering access manholes with a seal adequate to impart fluid tight integrity to the space between the inner tank and the external tank;
means for reducing the pressure in said space between the tanks to a negative pressure below atmospheric pressure; and
means for periodically automatically evacuating said space between the inner tank and the external tank to restore the negative pressure therein to a predetermined level, said means for periodically automatically evacuating said space comprising:
an electrical circuit;
a pressure switch in said circuit responsive to a selected first, relatively high pressure level in said space to close said electrical circuit, and responsive to a selected, second, relatively lower pressure level corresponding to said predetermined level in said space to open said electrical circuit; and
a vacuum pump electrically connected in said circuit to said pressure switch and pneumatically connected to said space for starting up and evacuating said space when said pressure switch closes the electrical circuit, and for stopping when said pressure switch opens said electrical circuit; and
a counter connected to said pressure switch for counting and registering the cumulative number of times said pressure switch opens and then closes.

16. A fluid storage system comprising:
a rigid tank having an exterior and an interior, and having an exterior surface and an interior surface;
a flexible liner positioned in said rigid tank and lining the interior of the tank and defining with said rigid tank, a space therebetween;
means for evacuating the space between the rigid tank and the flexible liner, said means for evacuating comprising:
a vacuum pump;
a suction assembly positioned between the tank and the liner for removing the air from the space between the tank and the liner;

conduit means connected between the vacuum pump and said suction subassembly; and valve means in said conduit means for isolating said vacuum pump from said suction subassembly;

means for continuously monitoring the magnitude of the pressure between said rigid tank and said flexible, liner, said monitoring means comprising:

a vacuum gauge;

a vacuum gauge conduit having one end connected to said vacuum gauge and having a second end;

condensate trap means connected to the second end of the vacuum gauge conduit; and a tubular element connected from said condensate trap means to a point on said conduit means between said valve means and said suction subassembly.

17. A fluid storage tank system comprising:

a rigid external tank having at least one manhole opening thereinto, and having an exterior and an interior and an outer surface and an inner surface;

a flexible internal tank lining the interior of the external tank and including a manhole opening registering with the manhole opening in said external tank, said internal tank having an embossed outer surface contacting the inner surface of said outer tank, and said inner tank also having an internal surface defining an interior volume within said internal tank;

means sealing said tanks to each other around said manhole openings to define an enclosed space between the tanks;

means for periodically drawing the air out of the enclosed space to automatically maintain the pressure therein between certain predetermined subatmospheric levels, said means for periodically drawing air out of said space comprising:

means for developing suction connected to said space; and control means connected to said suction developing means and to said space for sensing the pressure in said space, and for actuating said suction developing means when said pressure increases to a predetermined level, and for deactivating said suction developing means when said pressure in said space decreases to a predetermined level;

means for continuously monitoring the pressure in said enclosed space; and means for indicating the frequency at which said means for periodically drawing air out of said enclosed space is actuated, and to thereby indicate the rate at which the vacuum is decreased in said space, said frequency indicating means comprising:

a counter connected to said control means and responsive to control signals from said control means to the suction developing means to visually register the total number of times the suction developing means is actuated within a time interval.

18. A fluid storage tank system comprising:

an external tank having an inner side and an outer side;

a flexible inner tank positioned within and against said external tank and defining with said external tank, a space therebetween, said flexible inner tank having a geometric configuration complementary to that of said external tank, and said flexible inner tank having an interior and an exterior, said flexible inner tank further including embossing covering the entire external surface of said inner tank and contacting the inner side of said external tank, said embossing including random reticulated protrusions projecting from the outer surface of said inner liner and including randomly positioned ribs and webs of randomly varying radial thickness providing interconnected spatial networks through which pressure equalization can rapidly occur over the entire spatial zone between said inner tank and said external tank, said inner tank defining an internal cavity of sufficient volume to contain the volume of fluid which it is desired to confine therein during storage;

registering access manholes in the inner and external tanks facilitating access to the interior of the inner tank so that said access manholes are registered;

means sealing the inner tank and external tank to each other at the registering access manholes with a seal adequate to impart fluid tight integrity to the space between the inner and external tanks where said embossing is located;

means for reducing the pressure in said space between the tanks to a negative pressure below atmospheric pressure; and means for periodically automatically evacuating such space to restore the negative pressure therein to a predetermined level.

19. A fluid storage tank system as defined in claim 18 and further characterized as including means for removably closing said registering access manholes, and facilitating the selective opening of the registering access manholes without effecting the integrity of the seal of the tanks to each other at the registering access manholes.

20. A fluid storage tank system comprising:

a rigid tank having an interior and an exterior;

a flexible liner positioned in said tank and lining the interior of the tank and defining with said rigid tank, a space therebetween;

means for evacuating the space between the tank and the liner, said means for evacuating comprising:

a vacuum pump;

conduit means connected between the vacuum pump and the space between said rigid tank and said flexible liner to facilitate the evacuation of said space by the use of said vacuum pump; and valve means in said conduit means for isolating said vacuum pump from said space between said rigid tank and said flexible liner;

means for continuously monitoring the magnitude of the pressure in the space between said tank and said liner, said monitoring means comprising:

a vacuum gauge;

a vacuum gauge conduit having one end connected to said vacuum gauge and having a second end;

condensate trap means connected to the second end of the vacuum gauge conduit; and a tubular element connected from said condensate trap means to a point on said conduit means between said valve means and said suction subassembly.

21. A method for containing an environmentally deleterious fluid in a subterranean location comprising the steps of:

inserting a flexible liner which is inert to said fluid into a rigid container through an opening in the container, with the liner having a configuration which is complementary to the configuration of the container, and further having an opening which can be registered with the opening through the container, said liner having an internal surface and an external surface, and having a size such that when said flexible liner is filled with said fluid, said liner is expanded into a position in which the external wall thereof is adjacent the inner wall of the container;

after placement of the flexible liner in the rigid container, sealing the liner about the opening therein against said container so that the opening defined by said liner is in registry with the opening in said container through which said liner was inserted into said container;

after such sealing is complete, placing the container with the liner inside of the container in the described position with respect to the inner wall of the container into the ground in a subterranean excavation so that the aligned openings in the container and the liner face upwardly;

withdrawing air from between the liner and the container to develop a subatmospheric pressure therebetween;

prior to, during or after the withdrawal of said air to develop said subatmospheric pressure, filling a major portion of the volume within said liner with said fluid;

continuously maintaining said space between said liner and said container within a selected range of subatmospheric pressure;

continuously monitoring the pressure in said space; and periodically evacuating said space to maintain said subatmospheric pressure in said space within said predetermined limits.

* * * * *

UNITED STATES PATENT AND TRADEMARK OFFICE
CERTIFICATE OF CORRECTION

PATENT NO. : 4,796,676
DATED : January 10, 1989
INVENTOR(S) : John A. Hendershot and Leale E. Streebin It is certified that error appears in the above-identified patent and that said Letters Patent is hereby corrected as shown below:

In the Specification:

In Column 6, line 52, delete "meetal" and insert -metal-.
In Column 8, line 3, delete "losses" and insert -looses-.
In Column 14, line 35, delete "atmosphere" and insert -atmospheric-.
In Column 20, line 37, delete "comtents" and insert -contents-.

Signed and Sealed this

Second Day of May, 1989

Attest:

DONALD J. QUIGG

Attesting Officer

Commissioner of Patents and Trademarks